（12）United States Patent
Shinoda (10) Patent No.: US 8,918,268 B2
(45) Date of Patent: Dec. 23, 2014

(54) MALFUNCTION DETECTING DEVICE FOR INTERNAL COMBUSTION ENGINE

(75) Inventor: Yoshihisa Shinoda, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 13 days.

(21) Appl. No.: 13/375,419

(22) PCT Filed: Mar. 10, 2010

(86) PCT No.: PCT/JP2010/053981
§ 371 (c)(1),
(2), (4) Date: Nov. 30, 2011

(87) PCT Pub. No.: WO2011/111183
PCT Pub. Date: Sep. 15, 2011

(65) Prior Publication Data
US 2012/0072095 A1    Mar. 22, 2012

(51) Int. Cl.
| | | |
|---|---|---|
| *F02D 41/38* | (2006.01) | |
| *F02D 41/00* | (2006.01) | |
| *F02D 19/06* | (2006.01) | |
| *F02D 19/10* | (2006.01) | |
| *F02D 41/14* | (2006.01) | |
| *F02D 41/22* | (2006.01) | |

(52) U.S. Cl.
CPC ........ *F02D 41/0027* (2013.01); *F02D 19/0647* (2013.01); *F02D 19/10* (2013.01); *F02D 41/0085* (2013.01); *F02D 41/1498* (2013.01); *F02D 41/22* (2013.01); *F02D 19/061* (2013.01); *F02D 19/0615* (2013.01); *F02D 19/0623* (2013.01); *F02D 2041/224* (2013.01); *F02D 2200/0602* (2013.01); *Y02T 10/36* (2013.01); *Y02T 10/40* (2013.01); *F02D 19/0655* (2013.01)
USPC .......... 701/103; 123/295; 123/299; 123/301; 123/305; 123/491

(58) Field of Classification Search
USPC ........... 123/319, 339.19, 436, 687, 690, 575, 123/576, 578, 703, 198 D, 1 A, 27 GE, 525, 123/529, 43; 701/101, 102, 103, 104, 109, 701/114, 107
See application file for complete search history.

(56) References Cited

U.S. PATENT DOCUMENTS

| | | | |
|---|---|---|---|
| 5,524,582 A | 6/1996 | Suh et al. | |
| 5,806,497 A * | 9/1998 | Hosoya ......................... | 123/494 |

(Continued)

FOREIGN PATENT DOCUMENTS

| | | |
|---|---|---|
| JP | 06-229881 A | 8/1994 |
| JP | 11-107838 A | 4/1999 |

(Continued)

*Primary Examiner* — Hai Huynh
*Assistant Examiner* — Gonzalo Laguarda
(74) *Attorney, Agent, or Firm* — Sughrue Mion, PLLC (57) ABSTRACT

A malfunction detecting device for an internal combustion engine is mounted on a vehicle and includes an engine and a control unit. The engine is a multi-cylinder engine and is a bi fuel-enabled engine which is capable of switching plural kinds of fuels including a gas fuel and which can use bifuel. The control unit detects, in case of detecting a malfunction with respect to an imbalance of an air fuel ratio among the cylinders at a time of an operation based on the gas fuel, the malfunction based on variation of pressure pulsations of the gas fuel due to a fuel injection.

7 Claims, 7 Drawing Sheets

(56) References Cited

U.S. PATENT DOCUMENTS

| | | | |
|---|---|---|---|
| 5,809,973 A * | 9/1998 | Iida et al. | 123/491 |
| 6,003,478 A * | 12/1999 | Huber | 123/27 GE |
| 6,212,879 B1 | 4/2001 | Nishimura et al. | |
| 6,286,482 B1 * | 9/2001 | Flynn et al. | 123/435 |
| 6,371,092 B1 * | 4/2002 | Guglielmo et al. | 123/527 |
| 6,662,777 B2 * | 12/2003 | Tsuchiya | 123/299 |
| 6,668,791 B2 * | 12/2003 | Tetsuno et al. | 123/295 |
| 6,668,792 B2 * | 12/2003 | Yamauchi et al. | 123/295 |
| 7,263,973 B2 * | 9/2007 | Akita et al. | 123/431 |
| 7,627,416 B2 * | 12/2009 | Batenburg et al. | 701/103 |
| 8,047,064 B2 * | 11/2011 | Iwazaki et al. | 73/114.72 |
| 2014/0130776 A1 * | 5/2014 | Caley | 123/445 |

FOREIGN PATENT DOCUMENTS

| | | |
|---|---|---|
| JP | 11-159360 A | 6/1999 |
| JP | 2000-008897 A | 1/2000 |
| JP | 2000-213394 A | 8/2000 |
| JP | 2003-206772 A | 7/2003 |
| JP | 2006-077656 A | 3/2006 |
| JP | 2009-030455 A | 2/2009 |
| JP | 2009-041515 A | 2/2009 |

* cited by examiner

G1: CATALYST TEMPERATURE
G2: VEHICLE SPEED

FIG. 7

G3: NOx
G4: NMHC

MALFUNCTION DETECTING DEVICE FOR INTERNAL COMBUSTION ENGINE

CROSS REFERENCE TO RELATED APPLICATION

This application is a National Stage of International Application No. PCT/JP2010/053981 filed Mar. 10, 2011, the contents of all of which are incorporated herein by reference in their entirety.

TECHNICAL FIELD

The present invention relates to a malfunction detection for a vehicle which has an internal combustion engine.

BACKGROUND TECHNIQUE

Conventionally, there is known a vehicle which has a multi-cylinder engine and which detects an imbalance (hereinafter simply referred to as "the imbalance") of the air fuel ratios among the cylinders. For example, in Patent Reference-1, there is disclosed a method which detects the imbalance on the basis of detected values by the A/F sensor. In Patent Reference-2, there is described a technique which measures the oxygen storage capacity of a catalyst by engine speeds.

Patent Reference-1: Japanese Patent Application Laid-open under No. 2009-030455
Patent Reference-2: Japanese Patent Application Laid-open under No. 2009-041515

DISCLOSURE OF INVENTION

Problem to be Solved by the Invention

An A/F sensor is in an inactive state when the vehicle is in an initial motion. Therefore, it is difficult to detect the imbalance based on the A/F sensor at the time of the initial motion of the vehicle. Thus, in a case where a bifuel vehicle using a gas fuel such as CNG (Compressed Natural Gas) uses the gas fuel in a limited duration such as a duration of the initial motion of the vehicle, there is a possibility that the imbalance based on the A/F sensor cannot be detected in the duration. In this case, it is necessary to expand the operating range based on the gas fuel in order to detect the imbalance at the time of the operation in which the gas fuel is used.

The present invention has been achieved in order to solve the above problem. It is an object of this invention to provide a malfunction detecting device for an internal combustion engine, mounted on the bifuel vehicle and using a gas fuel, which can properly detect the imbalance without expanding the operating range based on the gas fuel.

Means for Solving the Problem

According to one aspect of the present invention, there is provided a malfunction detecting device for an internal combustion engine, including an engine which includes plural cylinders and which is capable of switching plural kinds of fuels including a gas fuel, and a control unit which detects, in case of detecting a malfunction with respect to an imbalance of air fuel ratios among the cylinders at a time of an operation based on the gas fuel, the malfunction based on a rotational speed variation of the engine and/or a variation of pressure pulsations of the gas fuel due to a fuel injection.

The above malfunction detecting device for an internal combustion engine is mounted on a vehicle and includes an engine and a control unit. The engine is a multi-cylinder engine and is a bifuel-enabled engine which is capable of switching plural kinds of fuels including a gas fuel. The control unit is an ECU (Electronic Control Unit) for example, and detects a malfunction with respect to an imbalance of air fuel ratios among the cylinders at the time of an operation based on the gas fuel. Namely, when detecting the imbalance, the control unit detects the malfunction based on a rotational speed variation of the engine and/or a variation of pressure pulsations of the gas fuel due to a fuel injection. The term "operation based on the gas fuel" herein indicates an operation which uses the gas fuel as a power source of the engine. Thereby, the malfunction detecting device for an internal combustion engine precisely executes the imbalance detection and can prevent the expansion of the operating range based on the gas fuel due to the execution of the imbalance detection.

In a manner of the malfunction detecting device for an internal combustion engine, a catalyst which is provided on an exhaust passage connecting to the engine is further included, and the engine is capable of switching between a compressed natural gas and a liquid fuel, and the control unit executes an operation based on the compressed natural gas only when a temperature of the catalyst is equal to or smaller than a predetermined temperature which is smaller than an activation temperature. In this manner, the malfunction detecting device for an internal combustion engine executes an operation based on the compressed natural gas when a temperature of the catalyst is equal to or smaller than a predetermined temperature which is smaller than an activation temperature, i.e., only when the catalyst cannot function enough and it is likely for the operation based on a liquid fuel to cause the deterioration of the emission. Even in this case, by detecting the malfunction based on the rotational speed variation of the engine and/or the variation of pressure pulsations of the gas fuel due to the fuel injection, the malfunction detecting device for an internal combustion engine can prevent the expansion of the operating range based on the gas fuel due to the execution of the imbalance detection while precisely executing the imbalance detection.

In another manner of the malfunction detecting device for an internal combustion engine, the control unit executes a correction of a criterion for determining whether or not the malfunction occurs used by a detection method for detecting the malfunction, based on measured values by another detection method at the time of the operation based on the gas fuel. The term "criterion for determining whether or not the malfunction occurs" herein indicates a threshold compared to the detected variation of the detected engine speeds in case of the imbalance detection based on the variation of the engine speeds, and indicates a threshold compared to the detected variation of pressure pulsations in case of the imbalance detection based on the variation of the pressure pulsations for example. The term "measured value" herein indicates the variation of the detected engine speeds in case of the imbalance detection based on the variation of the engine speeds, and indicates the variation of the detected pressure pulsations in case of the imbalance detection based on the variation of the pressure pulsations for example. In this manner, by correcting a criterion used by a detection method based on measured values by another detection method, the control unit enhances the accuracy of the criterion of the imbalance detection method and can improve the detection accuracy of the imbalance.

In another manner of the malfunction detecting device for an internal combustion engine, the control unit executes the correction at a time of an operating range where a detection accuracy of the other detection method is higher than a detection accuracy of the detection method for detecting the malfunction. Generally, there exist an operating range where the detection accuracy is high and an operating range where the detection accuracy is low depending on imbalance detection methods. Thus, in this manner, by correcting the criterion at the corrected side in the case where the detection accuracy of the correcting side of the detection method is higher than the detection accuracy of the corrected side of the detection method, the malfunction detecting device for an internal combustion engine enhances the accuracy of the criterion of the imbalance detection method and can improve the detection accuracy of the imbalance.

In another manner of the malfunction detecting device for an internal combustion engine, a sensor which outputs a detection value corresponding to an air fuel ratio is included, and the control unit executes, based on outputs of the sensor, the correction of the criterion which is used to detect the malfunction based on the rotational speed variation of the engine and/or the variation of the pressure pulsations of the gas fuel at the time of the operation based on the air fuel after the sensor is activated. The above-mentioned sensor maybe an A/F sensor or an O2 sensor. Thereby, the malfunction detecting device for an internal combustion engine enhances the accuracy of the criterion of the imbalance detection method and can improve the detection accuracy of the imbalance.

DETAILED DESCRIPTION OF THE PREFERRED EMBODIMENTS

Preferred embodiments of the present invention will be explained hereinafter with reference to the drawings.

[Schematic Configuration of Internal Combustion Engine]

Figure 1:
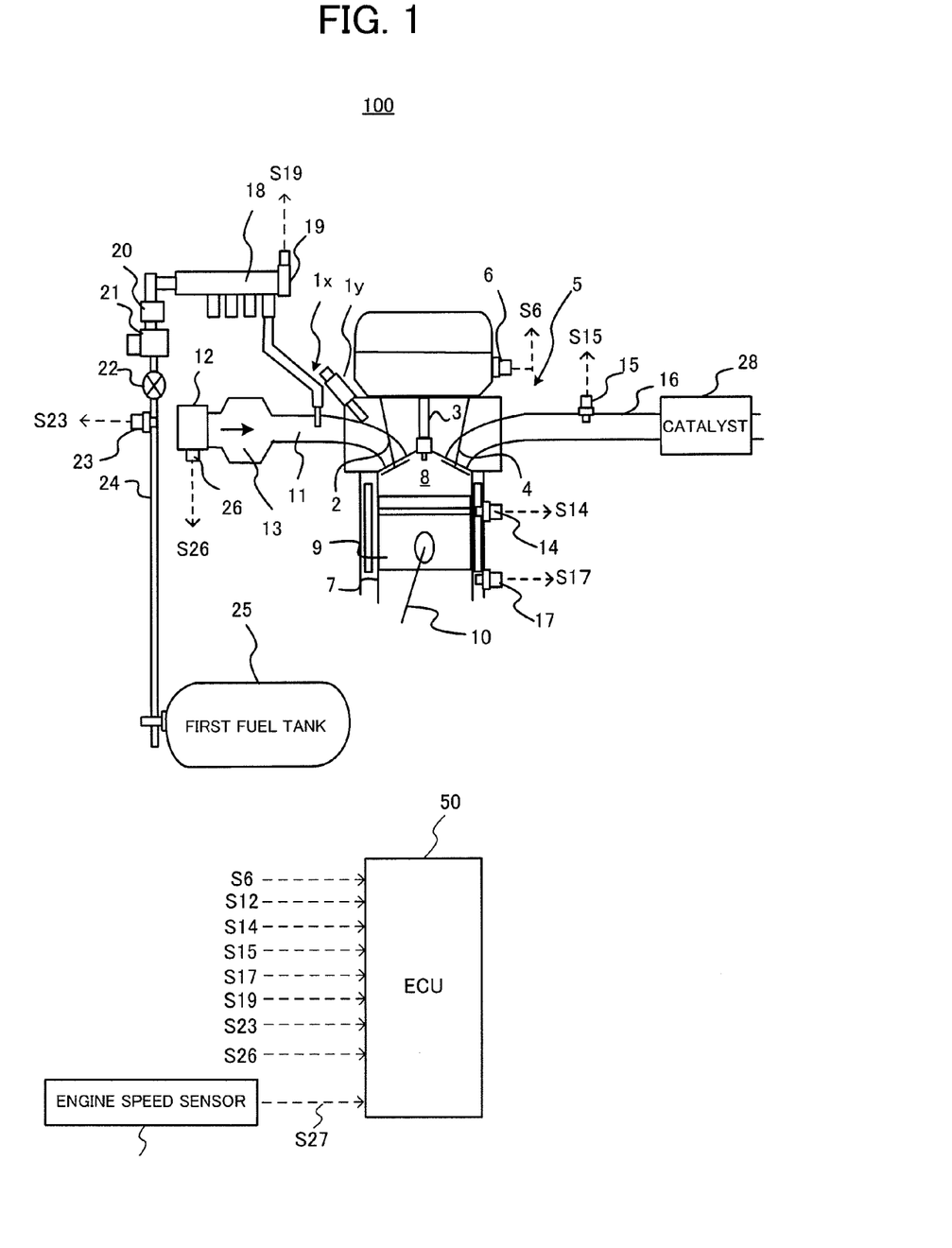
FIG. 1 is an example of schematic configuration of an internal combustion engine.

FIG. 1 shows a schematic configuration of an internal combustion engine (engine) to which a malfunction detecting device of an internal combustion engine according to the present invention is applied. The solid arrows show examples of flows of gas in the figure.

The internal combustion engine 100 mainly includes a first fuel injection valve 1x, a second fuel injection valve 1y, an intake valve 2, a sparking plug 3, an exhaust valve 4, a cylinder head 5, a cam angle sensor 6, a cylinder 7, a combustion chamber 8, a piston 9, a connecting rod 10, an intake passage 11, an electronic throttle valve 12, a surge tank 13, a water temperature sensor 14, an A/F sensor 15, an exhaust passage 16, a knocking sensor 17, a fuel delivery pipe 18, a gas temperature sensor 19, an oil separator 20, a regulator 21, an isolation valve 22, a gas pressure sensor 23, a fuel passage 24, a first fuel tank 25, a throttle position sensor 26, an engine speed sensor 27, a catalyst 28, and an ECU 50. It is noted that the internal combustion engine 100 practically includes plural cylinders 7 though only one cylinder 7 is shown in FIG. 1 for convenience of explanation.

The intake air (air) drawn in from the external passes through the intake passage 11, and the electronic throttle valve 12 adjusts the flow amount of the intake air which passes through the intake passage 11. The opening degree (hereinafter referred to as "throttle opening degree") of the electronic throttle valve 12 is controlled by the control signal supplied from the ECU 50. The surge tank 13, which is provided on the intake passage 11, stores the air (intake air) and distributes the intake air to each of the combustion chambers 8 of the cylinders via intake ports. The combustion chamber 8 is supplied with the fuel which is injected by the first injection valve (injector) 1x and the second injection valve 1y.

The first injection valve 1x injects the CNG (Compressed Natural Gas) which is the gas fuel stored in the first fuel tank 25 on the basis of the control of the ECU 50. The second injection valve 1y injects the liquid fuel stored in the second fuel tank which is not shown on the basis of the control of the ECU 50. Here, the liquid fuel maybe gasoline, light oil, alcohol such as methanol and ethanol, and mixed fuel of them, for example.

In addition, the intake valve 2 and the exhaust valve 4 are provided in the combustion chamber 8. The intake valve 2 controls the flow and cutoff between the intake passage 11 and the combustion chamber 8 by opening and closing. The exhaust valve 4 controls the flow and cutoff between the exhaust passage 16 and the combustion chamber 8 by opening and closing. The opening timings, the closing timings, and the lift amounts of the intake valve 2 and the exhaust valve 4 are controlled by the cam shafts which are not shown. The cam angle sensor 6 detects the angle (phase) of the cam shaft and provides the detection signal S6 to the ECU 50.

In the combustion chamber 8, the gaseous mixture of the intake air and the fuel which are supplied as described above in the intake stroke is combusted by the ignition of the sparking plug 3 after the compression stroke. In this case, the piston 9 is reciprocated by the combustion, then the force of the reciprocation is transmitted to the crank shaft (not shown) via the connecting rod 10, and then the crank shaft rotates. The exhaust gas generated by the combustion in the combustion chamber 8 is discharged to the exhaust passage 16 in the exhaust stroke.

On the exhaust passage 16, there are provided the A/F sensor 15 and the catalyst 28. The A/F sensor 15 generates an output voltage proportional to the air fuel ratio (hereinafter referred to as "air fuel ratio AF") of the combusted gaseous mixture. The output voltage of the A/F sensor 15 is supplied to the ECU 50 by the detection signal S15. In addition, the water temperature sensor 14 and the knocking sensor 17 are provided on the engine block. The water temperature sensor 14 detects the water temperature (engine water temperature) of the coolant in the water jacket. The water temperature sensor 14 supplies the detection signal S14 corresponding to the engine water temperature to the ECU 50. The knocking sensor 17 detects a knocking on the basis of a vibration of the cylinder block. The knocking sensor 17 supplies the detection signal S17 to the ECU 50.

Meanwhile, on the fuel passage 24 connected to the first fuel tank 25, there are provided the gas pressure sensor 23, the isolation valve 22, the regulator 21, and the oil separator 20. The gas pressure sensor 23 detects the gas pressure corresponding to the fuel pressure in the fuel passage 24 and supplies the detection signal S23 thereof to the ECU 50. The isolation valve 22 controls the flow and cutoff in the fuel passage 24 based on the control of the ECU 50. The regulator 21 is a mechanism which keeps the fuel pressure constant. The oil separator 20 separates impurities from the fuel passing through the fuel passage 24 and supplies the fuel delivery pipe 18 with the fuel from which the impurities is removed. The fuel delivery pipe 18 distributes the fuel supplied from the fuel passage 24 to the first fuel injection valves 1x each of which corresponds to each of the cylinders 7. In addition, on the fuel delivery pipe 18, there is provided the gas pressure sensor 19 which detects the gas pressure (fuel pressure) in the fuel delivery pipe 18. The gas pressure sensor 19 supplies the ECU 50 with the detection signal S19 corresponding to the gas pressure.

The engine speed sensor 27 generates output pulses indicating the engine speed (hereinafter referred to as "engine speed Ne"). The engine speed sensor 27 supplies the output pulses to the ECU 50 by the detection signal S27.

The ECU 50 includes a CPU (Central Processing Unit), a ROM (Read Only Memory), and a RAM (Random Access Memory), and executes various controls of each components in the internal combustion engine 100. For example, the ECU 50 executes the control over the first and the second fuel injection valves 1x, 1y on the basis of the detection signals supplied as described above. The ECU 50 also executes the detection of the imbalance (hereinafter referred to as "imbalance detection") on the basis of the engine speed Ne detected by the engine speed sensor 27 and the gas pressure (hereinafter referred to as "gas pressure Pg") detected by the gas pressure sensor 23 or the gas pressure sensor 19. The ECU 50 functions as a control unit in the present invention.

Hereinafter, the term "CNG operation" indicates the operation in which the fuel injection is executed by the first fuel injection valve 1x, i.e., the operation in which the CNG is used as a power source, and the term "liquid fuel operation" indicates the operation in which the fuel injection is executed by the second fuel injection valve 1y, i.e., the operation in which the liquid fuel is used as a power source. The term "imbalance ratio" indicates the ratio of the deviation at the time when an injection quantity of only one cylinder 4 deviates from the stoiciometry equivalent.

Hereinafter, the control executed by the ECU 50 will be concretely described in the following first embodiment and the second embodiment.

[First Embodiment]

Summarily, in the first embodiment, when executing the imbalance detection in the CNG operation, the ECU 50 executes a detection (hereinafter referred to as "detection of the rotational fluctuation") based on the engine speed Ne and/or a detection (hereinafter referred to as "detection of the gas pressure fluctuation") based on the gas pressure Pg. Then, the ECU 50 executes the CNG operation only in the operation range where the vehicle is in an initial motion and where the temperature (hereinafter referred to as "catalyst temperature") of catalyst 28 is under the activating temperature and where there is a possibility of the emission deterioration, and executes the liquid fuel operation in other operation range.

Thereby, the ECU 50 executes the imbalance detection while preventing the expansion of the operation range of the CNG operation.

Hereinafter, concrete descriptions will be given of the detection of the rotational fluctuation and the detection of the gas pressure fluctuation, respectively. It is noted that hereinafter, the internal combustion engine 100 is regarded as a four-cylinder engine for example and each of the cylinders 7 is referred to as "first cylinder" to "fourth cylinder", respectively.

(Detection of Rotational Fluctuation)

The ECU 50 detects the imbalance among the cylinders at the time of the CNG operation on the basis of the variation of the engine speeds Ne detected by the engine speed sensor 27. Thereby, the ECU 50 precisely detects the imbalance in a case where any one of cylinders 7 becomes abnormally imbalanced to the lean side or to the rich side.

This description will be supplemented below. Generally, when GNG is used as the fuel, in both cases of the imbalance to the rich side and the imbalance to the lean side, the deterioration of the combustion comes out. In this case, the angular speed of the crank angle (i.e., the engine speed Ne) becomes slower in a duration corresponding to the cylinder 7 in which the imbalance arises, and inversely proportional to this, the duration becomes longer.

In consideration of the above fact, the ECU 50 monitors the engine speed Ne corresponding to each duration of each cylinder 7 to detect whether or not the imbalance occurs. Thereby, it can be possible to detect the both imbalances to the rich side and to the lean side.

Next, a detailed description will be given of a concrete example of the detection of the rotational fluctuation with reference to FIGS. 2A and 2B.

Figure 2A:
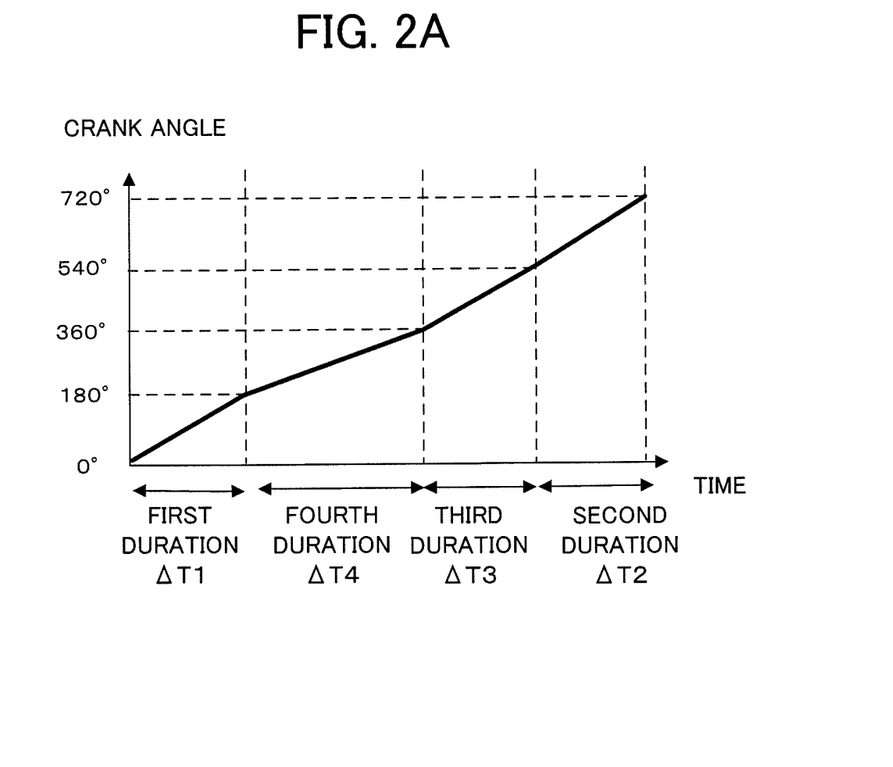
FIGS. 2A and 2B show an outline of the imbalance detection method based on a variation of the engine speed.

FIG. 2A is an example of a graph showing the time variation of the crank angle in one cycle. Here, it is assumed that the crank angle varies in the range from 0° to 720° in one cycle for example. In FIG. 2A, "first duration $\Delta T1$" indicates a duration when the first cylinder outputs the power to the crank shaft, "fourth duration $\Delta T4$" indicates a duration when the fourth cylinder outputs the power to the crank shaft, "third duration $\Delta T3$" indicates a duration when the third cylinder outputs the power to the crank shaft, and "second duration $\Delta T2$" indicates a duration when the second cylinder outputs the power to the crank shaft.

In FIG. 2A, the first duration $\Delta T1$ to the third duration $\Delta T3$ have an almost equal time length. In contrast, the fourth duration $\Delta T4$ is longer than the first duration $\Delta T1$ to the third duration $\Delta T3$ due to the deterioration of the combustion of the fourth cylinder based on imbalance.

Figure 2B:
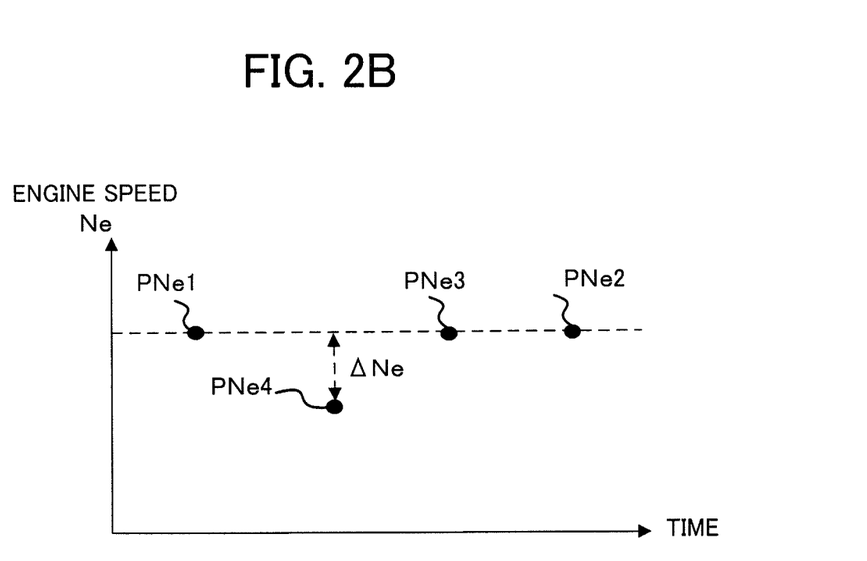

FIG. 2B is a diagram in which the engine speeds Ne in one cycle are plotted per period corresponding to the first duration $\Delta T1$ to the fourth duration $\Delta T4$. Concretely, the corresponding point "PNe1" corresponds to the engine speed Ne at the time when the first cylinder outputs the power to the crank shaft, and the corresponding point "PNe4" corresponds to the engine speed Ne at the time when the fourth cylinder outputs the power to the crank shaft, and the corresponding point "PNe3" corresponds to the engine speed Ne at the time when the third cylinder outputs the power to the crank shaft, and the corresponding point "PNe2" corresponds to the engine speed Ne at the time when the second cylinder outputs the power to the crank shaft.

As described above, each of the engine speeds Ne is inversely proportional to the first duration $\Delta T1$ to the fourth duration $\Delta T4$. Therefore, in FIG. 2B, the engine speeds Ne each of which corresponds to the first duration $\Delta T1$ to the third duration $\Delta T2$ are almost equal, and the engine speed Ne which corresponds to the fourth duration ΔT4 is smaller than the other engine speeds Ne due to the deterioration of the combustion based on the imbalance in the fourth cylinder.

Here, a description will be given of the concrete procedure of the detection of the rotational fluctuation with reference to FIGS. 2A and 2B. At first, the ECU 50 obtains the engine speeds Ne each of which corresponding to the first duration ΔT1 to the fourth duration ΔT4 from the engine speed sensor 27 as shown in FIG. 2B. Then, the ECU 50 determines whether or not the imbalance occurs on the basis of the variation of the engine speed Ne. For example, the ECU 50 determines that the imbalance occurs when it finds a value which varies by a predetermined value (hereinafter referred to as "threshold ΔNeth") or more from the last obtained value and/or the next obtained value among the obtained engine speed Ne. The above-mentioned threshold ΔNeth is determined by trial experiments in consideration of the imbalance ratio to be detected.

Concretely, the ECU 50 detects the rotational speed variation "ΔNe" corresponding to the difference between the engine speed Ne at the corresponding point Pne4 and the engine speed Ne at the corresponding point PNe1 or the corresponding point PNe3 in case of FIG. 2B. At that time, the rotational speed variation ΔNe may be a difference calculated on the basis of either the corresponding point PNe1 or the corresponding point PNe3, or may be an average of differences calculated on the basis of each of the corresponding point PNe1 and the corresponding point PNe3. Then, the ECU 50 determines that the imbalance occurs when the rotational speed variation ΔNe is larger than the threshold ΔNeth. On the other hand, the ECU 50 determines that the imbalance does not occur or that the imbalance ratio is tolerably small when the rotational speed variation ΔNe is equal or smaller than the threshold ΔNeth.

As described above, the ECU 50 can detect the imbalance of each cylinder based on the variation of the engine speeds Ne.

Figure 3:
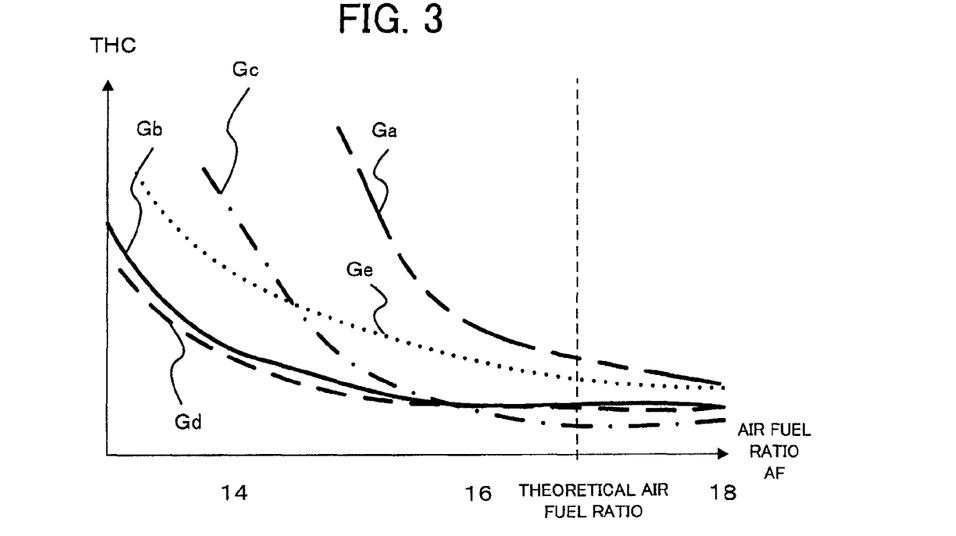
FIG. 3 shows examples of graphs which indicate variations of amounts of total hydrocarbon emitted by the engine based on the air fuel ratio at each operation state.

Next, an additional description will be given of the effects by the detection of the rotational fluctuation with reference to FIG. 3. FIG. 3 shows graphs which indicate the variations of the emission amounts of the THC (Total Hydro Carbon) to the air fuel ratio AF. It is noted that the THC, which is discharged at the time of the CNG operation, is a compound indicative of the combustion stability. In FIG. 3, the graph "Ga" indicates the case where the internal combustion engine 100 is an idling state and the engine speed Ne is "650 rpm", and the graph "Gb" indicates a case where the internal combustion engine 100 is a high-load state and the engine speed Ne is "2000 rpm", and the graph "Gc" indicates the case where the internal combustion engine 100 is a low-load state and the engine speed Ne is "2000 rpm", and the graph "Gd" indicates the case where the internal combustion engine 100 is a high-load state and the engine speed Ne is "1200 rpm", and the graph "Ge" indicates the case where the internal combustion engine 100 is a low-load state and the engine speed Ne is "1200 rpm".

As shown in FIG. 3, at the time of the CNG operation, in any cases of operation states shown by the graphs Ga to Gd, the more the air fuel ratio AF changes toward the rich side, the more the emission amount of the THC increases. Namely, in case of the CNG operation, the more the air fuel ratio changes toward the rich side, the worse the combustion stability becomes at any operation state. Therefore, at the time of the CNG operation, the ECU 50 determines the deterioration of the combustion for each cylinder 7 on the basis of the variation of the engine speeds Ne as described above and can detect the imbalance to the rich side.

On the other hand, at the time of the liquid fuel operation using the liquid fuel such as gasoline, contrary to the case of FIG. 3, the combustion stability does not deteriorate even when the air fuel ratio AF changes toward the rich side. Thus, in case of the liquid fuel operation, it is difficult for the ECU 50 to detect the imbalance to the rich side even when the ECU 50 monitors the engine speed Ne.

In either case of the CNG operation and the liquid fuel operation, when the imbalance to the lean side occurs, the deterioration of the combustion occurs. Therefore, the ECU 50 can detect the imbalance to the lean side based on the engine speed Ne in either case of the CNG operation and the liquid fuel operation.

As described above, the ECU 50 can detect the imbalance to the lean side and to the rich side based on the detection of the rotational fluctuation at the time of the CNG operation.

(Detection of Gas Pressure Fluctuation)

The ECU 50 detects the gas pressure Pg thereby to determine whether or not the imbalance occurs based on the variation of the pulsation of the gas pressure Pg by the fuel injection. Concretely, the ECU 50 calculates the decreasing degrees of the gas pressures Pg corresponding to the fuel injections to each cylinder 7 and estimates the injection quantities, of each cylinder 7. Thereby, the ECU 50 detects the imbalance in a case where any one of cylinders 7 becomes imbalanced to the lean side or to the rich side.

Figure 4:
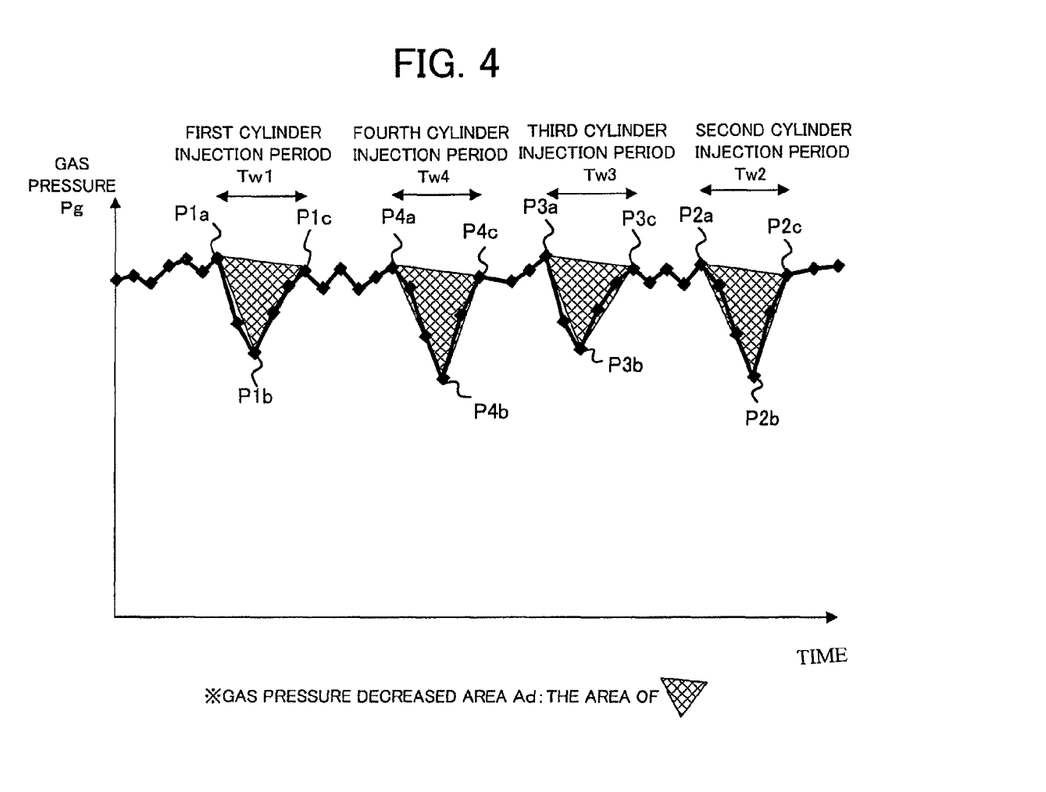
FIG. 4 shows an outline of the imbalance detection method based on pressure pulsations of the CNG.

This concrete method will be described with reference to FIG. 4. FIG. 4 shows an example of a graph indicating the time variation of the gas pressure Pg at the time of the CNG operation. The graph in FIG. 4 is a graph which connects the corresponding points corresponding to the gas pressure Pg obtained by the gas pressure sensor 19 at constant time intervals. In FIG. 4, a period of the fuel injection to the first cylinder is referred to as "first cylinder injection period Tw1", and a period of the fuel injection to the second cylinder is referred to as "second cylinder injection period Tw2", and a period of the fuel injection to the third cylinder is referred to as "third cylinder injection period Tw3", and a period of the fuel injection to the fourth cylinder is referred to as "fourth cylinder injection period Tw4".

As shown in FIG. 4, the gas pressure Pg temporarily decreases due to the fuel injections to each of the first cylinder to fourth cylinder. In FIG. 4, at first, the gas pressure Pg temporarily decreases due to the fuel injection to the first cylinder, then the gas pressure Pg is kept constant by the regulator 21. Similarly, the gas pressure Pg temporarily decreases due to the fuel injections with respect to the fourth cylinder, the third cylinder, and the second cylinder.

Then, as a first example, the ECU 50 executes the imbalance detection based on the area (each of the hatched areas in FIG. 4, hereinafter referred to as "gas pressure decreased area Ad") indicated by the trajectory of the gas pressure Pg which is decreased due to the fuel injections in the first cylinder injection period Tw1 to the fourth cylinder injection period Tw4, respectively. Namely, the ECU 50 regards the gas pressure decreased areas Ad formed concavely in the first cylinder injection period Tw1 to the fourth cylinder injection period Tw4 as the injection quantity equivalents, and assumes that the injection quantity is large as the area is large and that the injection quantity is small as the area is small.

For example, at first, the ECU 50 specifies the corresponding points "P1a" to "P4a" corresponding to the gas pressures Pg detected just before the fuel injection as shown in FIG. 4. Namely, the corresponding points "P1a" to "P4a" corresponds to the gas pressures Pg at the start time of the first cylinder injection period Tw1 to the fourth cylinder injection period Tw4, respectively. For example, in a case where the detected gas pressure Pg is smaller than a predetermined value and the gas pressure Pg obtained just before is equal or larger than the predetermined value, the ECU 50 specifies the gas pressures Pg obtained just before as the corresponding points "P1a" to "P4a". The above-mentioned predetermined value is set to the lower limit in possible values of the gas pressure Pg at the time when the fuel injection is not executed, for example.

Similarly, the ECU 50 specifies the corresponding points "P1c" to "P4c" which corresponds to the gas pressures Pg detected just after the fuel injections from FIG. 4. Namely, the corresponding points "P1c" to "P4c" corresponds to the gas pressures Pg at the ending time of the first cylinder injection period Tw1 to the fourth cylinder injection period Tw4, respectively. For example, in a case where the detected gas pressure Pg is equal or larger than a predetermined value and the gas pressure Pg obtained just before is smaller than the predetermined value, the ECU 50 specifies the detected gas pressures Pg as the corresponding points "P1c" to "P4c", respectively.

Furthermore, the ECU 50 specifies the corresponding points "P1b" to "P4b" which indicate the lower limits of the gas pressures Pg in each injection period of the first cylinder injection period Tw1 to the fourth cylinder injection period Tw4. For example, the ECU 50 specifies each corresponding point where the gas pressure Pg is smallest in the first cylinder injection period Tw1 to the fourth cylinder injection period Tw4, each of which is specified by the corresponding points "P1a" to "P4a" and the corresponding points "P1c" to "P4c", as the corresponding points P1b to p4 b.

Next, the ECU 50 specifies the gas pressure decreased areas Ad corresponding to each injection period. For example, the ECU 50 regards the each corresponding point as the two dimensional coordinates of time and the gas pressure Pg, and specifies the triangle area formed by the corresponding points P1a to P1c as the gas pressure decreased area Ad of the first cylinder injection period Tw1. Similarly, the ECU 50 specifies the gas pressure decreased areas Ad of the second cylinder injection period Tw2 to the fourth cylinder injection period Tw4 from the three pair of the corresponding points, respectively.

Then, the ECU 50 regards that the gas pressure decreased areas Ad correspond to the injection quantities of each cylinder 7, and determines whether or not the imbalance occurs. For example, the ECU 50 calculates a representative value such as the average and the central value of the decreased areas Ad, and determines whether or not there exists the gas pressure decreased area Ad which deviates from the representative value by more than a predetermined value. When there exists the gas pressure decreased area Ad which deviates from the representative value by more than the predetermined value, the ECU 50 determines that the imbalance occurs in the cylinder 7 corresponding to the gas pressure decreased area Ad. Instead, the ECU 50 may set a range of the gas pressure decreased area Ad where the imbalance does not likely to occur and determine that the imbalance occurs in a case where any of the gas pressure decreased areas Ad does not belongs to the range.

As a second example, the ECU 50 executes the imbalance detection based on each lower limit (hereinafter referred to as "lower limit gas pressure PglimL") of the gas pressures Pg in the first cylinder injection period Tw1 to the forth cylinder injection period Tw4. Namely, in this case, the ECU 50 determines that the injection quantity is large as the lower limit gas pressure PglimL is small and that the injection quantity is small as the decrease of the gas pressure Pg is small.

Concretely, at first, the ECU 50 calculates the lower limit gas pressures PglimL each of which corresponds to each of the injection periods. For example, similarly to the first example, the ECU 50 calculates the corresponding points P1b to P4b corresponding to the lower limit gas pressures PglimL in the first cylinder injection period Tw1 to the fourth cylinder injection period Tw4.

Then, the ECU 50 determines whether or not the imbalance occurs on the basis of each of the lower limit gas pressures PglimL. For example, the ECU 50 calculates representative values of each of the lower limit gas pressure PglimL such as the averages and the central values, and determines that the imbalance occurs in a case where each of the lower limit representatives deviates from the representative value by a predetermined value. The above-mentioned predetermined value is set on the basis of the imbalance ratio to be detected for example and is stored in the memory of the ECU 50. Instead, the ECU 50 previously sets a range of the lower limit gas pressure PglimL in which the imbalance is not likely to occur and may determine that the imbalance occurs in a case where the any one of the lower limit gas pressure PglimL does not belong to the above range. The above-mentioned range is set based on the imbalance ratio to be detected for example and is stores in the memory of the ECU 50.

It is noted that the ECU 50 may execute the detection of the rotational fluctuation and the detection of the gas pressure fluctuation at the same time thereby to determine whether or not the imbalance occurs as described above. In this case, for example, the ECU 50 may determine that the imbalance occurs when it determines that imbalance exists by either one of the detection methods at least, and also may determine that the imbalance occurs when it determines that the imbalance exists by both detection methods.

(Combination with Detection Based on A/F Sensor)

Next, a description will be given of the imbalance detection method which is a combination of the imbalance detection based on the A/F sensor 15 with the detection of the rotational fluctuation and the detection of the gas pressure fluctuation which are described above. Summarily, the ECU 50 executes the imbalance detection based on the A/R sensor 15 when determining that the detection accuracy of the A/F sensor 15 is high. On the other hand, the ECU 50 executes the detection of the rotational fluctuation and/or the detection of the gas pressure fluctuation when determining that the detection accuracy of the A/F sensor is low.

Figure 5A:
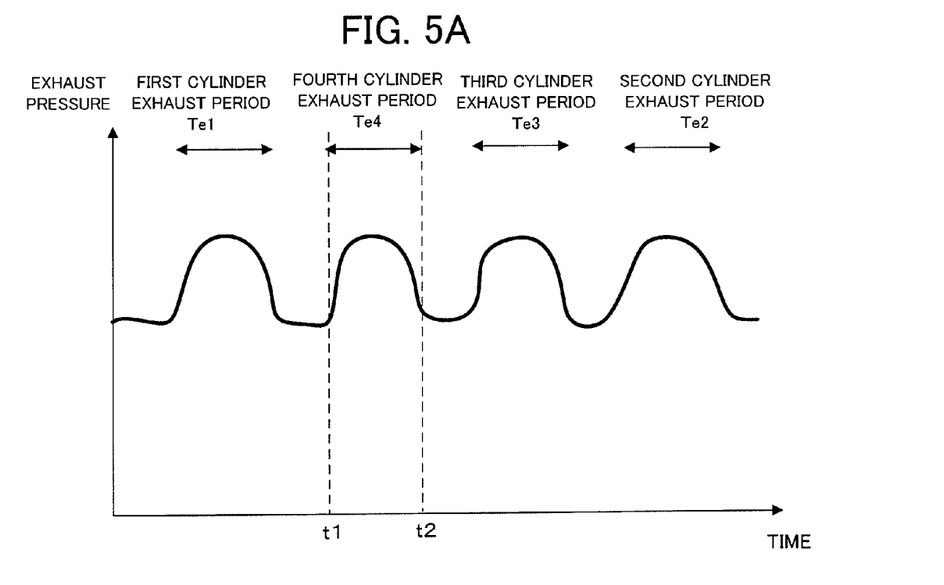
FIG. 5A and 5B show an outline of the imbalance detection method based on a variation of the air fuel ratio.
Figure 5B:
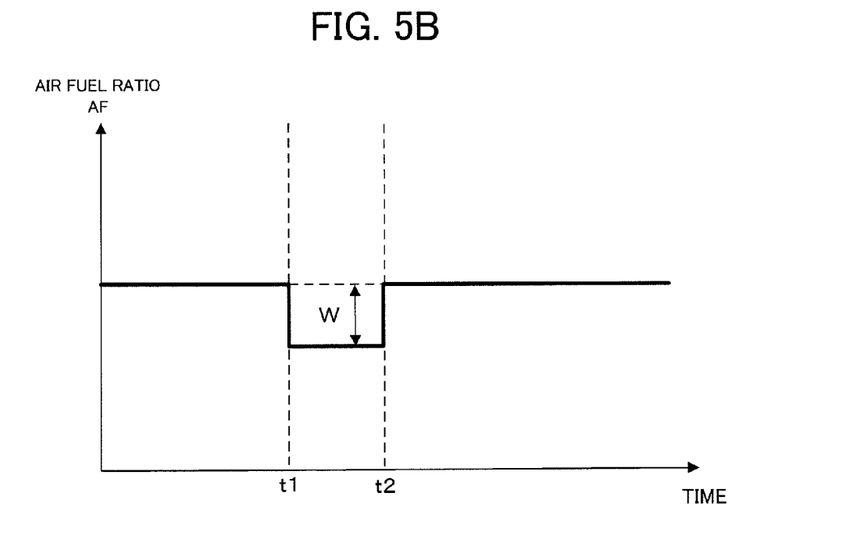

First, a description will be given of an example of the imbalance detection method based on the A/F sensor 15. FIGS. 5A and 5B show schematic diagrams of the imbalance detection method based on the A/F sensor 15. Concretely, FIG. 5A shows a time variation of the exhaust pressure based on the exhaust strokes of the first cylinder to the fourth cylinder in one cycle. FIG. B shows a time variation of the air fuel ratio AF based on the detection values by the A/F sensor 15 corresponding to FIG. 5A. In FIG. 5A, the terms "first cylinder exhaust period Te1" to "fourth cylinder exhaust period Te4" indicate the periods corresponding to the exhaust strokes of the first cylinder to fourth cylinder, respectively.

As shown in FIG. 5A, the four cylinders 7 go through the exhaust stroke in order of the first cylinder, the fourth cylinder, the third cylinder, and the second cylinder, and the exhaust pressure temporarily increases according to the exhaust strokes. Then, as shown in FIG. 5B, the ECU 50 detects that the detection values by the A/F sensor 15 have fluctuated by a predetermined fluctuation width "W" in the fourth cylinder exhaust period Te4 corresponding to the period from a time "t1"to a time "t2". In this case, the ECU 50 determines that the imbalance occurs when the fluctuation width W is longer than a predetermined threshold (hereinafter referred to as "threshold Wth"). It is noted that the threshold Wth is determined by experimental trials in consideration of the imbalance ratio to be detected. On the other hand, the ECU 50 determines that the imbalance does not occur or the imbalance ratio is tolerably small when the fluctuation width W is equal or shorter than the threshold Wth.

Next, a description will be given of timings of switching between the detection based on the A/F sensor 15, and the detection of the rotational fluctuation or the detection of the gas pressure fluctuation. As described above, the ECU 50 executes the detection of the rotational fluctuation and/or the detection of the gas pressure fluctuation when determining that the detection accuracy of the A/F sensor 15 is low. Here, the ECU 50 estimates the detection accuracy of the A/F sensor 15 based on whether or not the A/F sensor 15 is in an active state and whether or not the amount of the intake air flow is equal or larger than a predetermined amount, for example. It is noted that the ECU 50 determines that the A/F sensor 15 is in an active state if the duration after the energization of the A/F sensor 15 reaches a predetermined time width. Then, the ECU 50 determines that the detection accuracy of the A/F sensor 15 is low in a case where it is determined that the A/F sensor is not in an active state or a case where the amount of the intake air flow is smaller than the predetermined amount. On the other hand, the ECU 50 determines that the detection accuracy of the A/F sensor 15 is high in a case where the A/F sensor 15 is in an active state and the amount of the intake air flow is equal or larger than the predetermined amount. The detection accuracy of the A/F sensor 15 will be described in the below section "Effect".

(Imbalance Detection at Liquid Fuel Operation)

At the time of the liquid fuel operation, the ECU 50 executes the imbalance detection based on the A/F sensor 15. Preferably, the ECU 50 additionally executes the detection of the rotational fluctuation at the time of the liquid fuel operation, detects the imbalance to the rich side by the imbalance detection based on the A/F sensor 15 and detects the imbalance to the lean by the detection of the rotational fluctuation.

An additional explanation will be described below. Generally, at the time of the lean compared to the time of the rich, the response of the A/F sensor 15 become late and it is hard to detect the imbalance of the air fuel ratio AF among the cylinders. Meanwhile, since the combustion of the liquid fuel deteriorates at the time of the lean as described above, the ECU 50 can detect the imbalance to the lean side by the detection of the rotational fluctuation. In consideration of the above facts, the ECU 50 executes both the imbalance detection based on the A/F sensor 15 and the detection of the rotational fluctuation at the time of the liquid combustion operation, and thereby can detect the imbalance more precisely.

(Effect)

Figure 6:
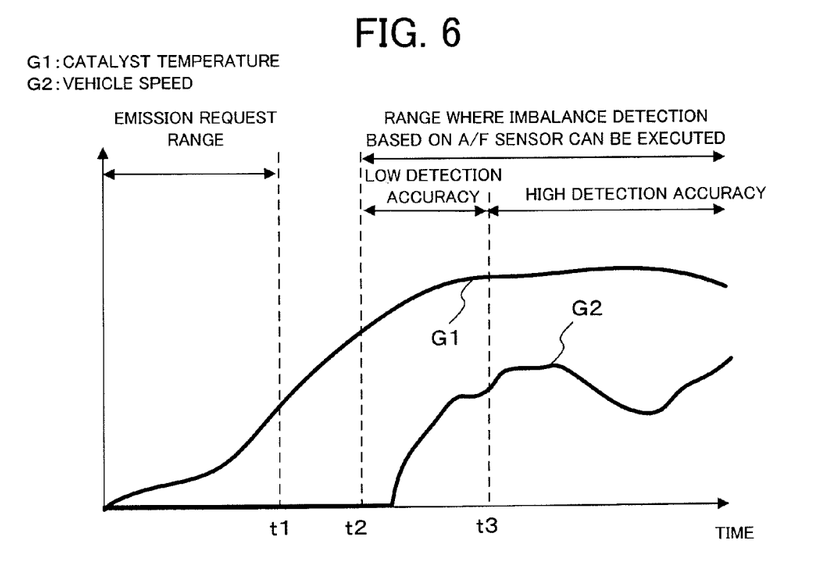
FIG. 6 shows graphs indicating the operating range of the vehicle and the time variations of the catalyst temperature and the vehicle speed.
Figure 7:
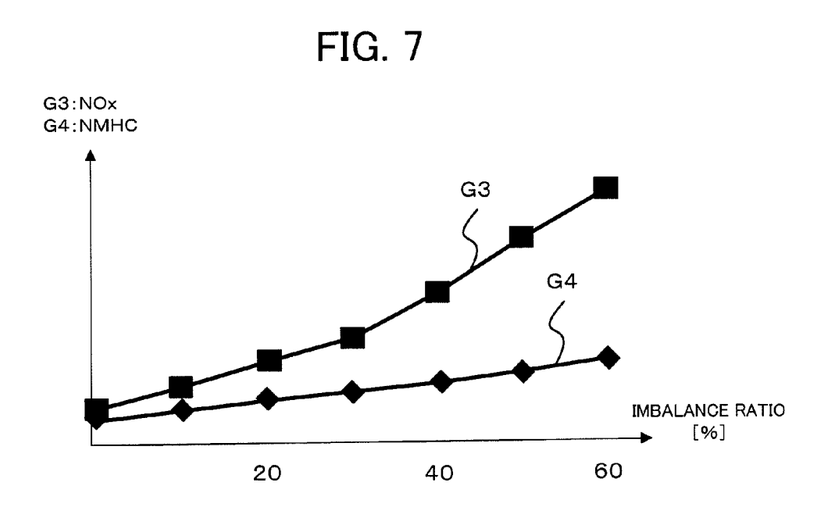
FIG. 7 shows examples of graphs which indicate the exhaust amounts of NOx and NMHC corresponding to each imbalance ratio.

Next an additional description will be given of the effect in the first embodiment with reference to FIG. 6 and FIG. 7. FIG. 6 shows graphs of the time variations of the vehicle speed and the catalyst temperature in an initial motion of the vehicle (hereinafter referred to as "mounting vehicle") on which the internal combustion engine 100 is mounted. Concretely, the graph "G1" shows the time variation of the catalyst temperature and the graph "G2" shows the time variation of the vehicle speed. Here, the term "emission request range" indicates the operating range where there is a possibility that the emission deteriorates due to the low temperature of the catalyst.

First, at the time of the emission request range corresponding to the period by a time "t1" when the catalyst temperature is under the half of the activating temperature, the ECU 50 executes the CNG operation in order to prevent the deterioration of the emission. Thereby, the ECU 50 suppresses the density of the exhaust gas and prevents the deterioration of the emission due to the low temperature of the catalyst.

Then, at the time "t2", the A/F sensor 15 is activated. Therefore, the ECU 50 can execute the imbalance detection based on the A/F sensor 15. But, even in this case, the detection accuracy of the A/F sensor 15 is still low by the time t3 due to the fact that the amount of intake air flow is small. Then, after the time "t3", the detection accuracy of the A/F sensor 15 become higher due to the facts that the A/F sensor 15 is activated and that the amount of the intake air flow is equal or lager than a predetermined amount.

Therefore, the ECU 50 cannot execute the imbalance detection of the CNG at the time of the emission request range in a case (hereinafter referred to as "comparative example") where the imbalance detection based only on the A/F sensor 15 is executed at the time of the CNG operation. So, in case of the comparative example, it is necessary to put off the CNG operation by the time t2 or the time t3 or to restart the CNG operation after the time t2 or the time t3 in order to execute the imbalance detection at the time of the CNG operation. Namely, in this case, the operating range where the CNG operation is executed expands. Then, in a case where the period when the CNG operation is executed becomes long chronically due to the expansion of the operating range where the CNG operation is executed, as well as the need to enlarge the capacity of the first fuel tank 25 arises, the switching control between the CNG operation and the liquid fuel operation and the engine control thereof become complicate.

On the other hand, in a case where the imbalance detection does not executed and the imbalance is permitted, there is a possibility that the emission deteriorates. FIG. 7 shows graphs which indicate the exhaust amounts of NOx and NMHC (Non Methane Hydro Carbons) corresponding to each imbalance ratio. Concretely, the graph "G3" indicates the exhaust amount of NOx corresponding to each imbalance ratio, and the graph "G4" indicates the exhaust amount of NMHC corresponding to each imbalance ratio. As shown in FIG. 7, in response to the increase of the imbalance ratio, the exhaust amounts of NOx and NMHC increase and the emission deteriorates.

In consideration of the above-mentioned facts, the ECU 50 executes the detection of the rotational fluctuation and/or the detection of the gas pressure fluctuation at the time of the CNG operation thereby to execute the imbalance detection while preventing the expansion of the CNG operating range even in a case where the A/F sensor 15 is not activated. Therefore, the ECU 50 can limit the CNG operating range to a period of an initial motion of the mounting vehicle, i.e., a period when the temperature of the catalyst does not reach the activating temperature, and can prevent the expansion of the capacity of the first fuel tank 25 and the complexity of the controls.

(Process Flow)

Figure 8:
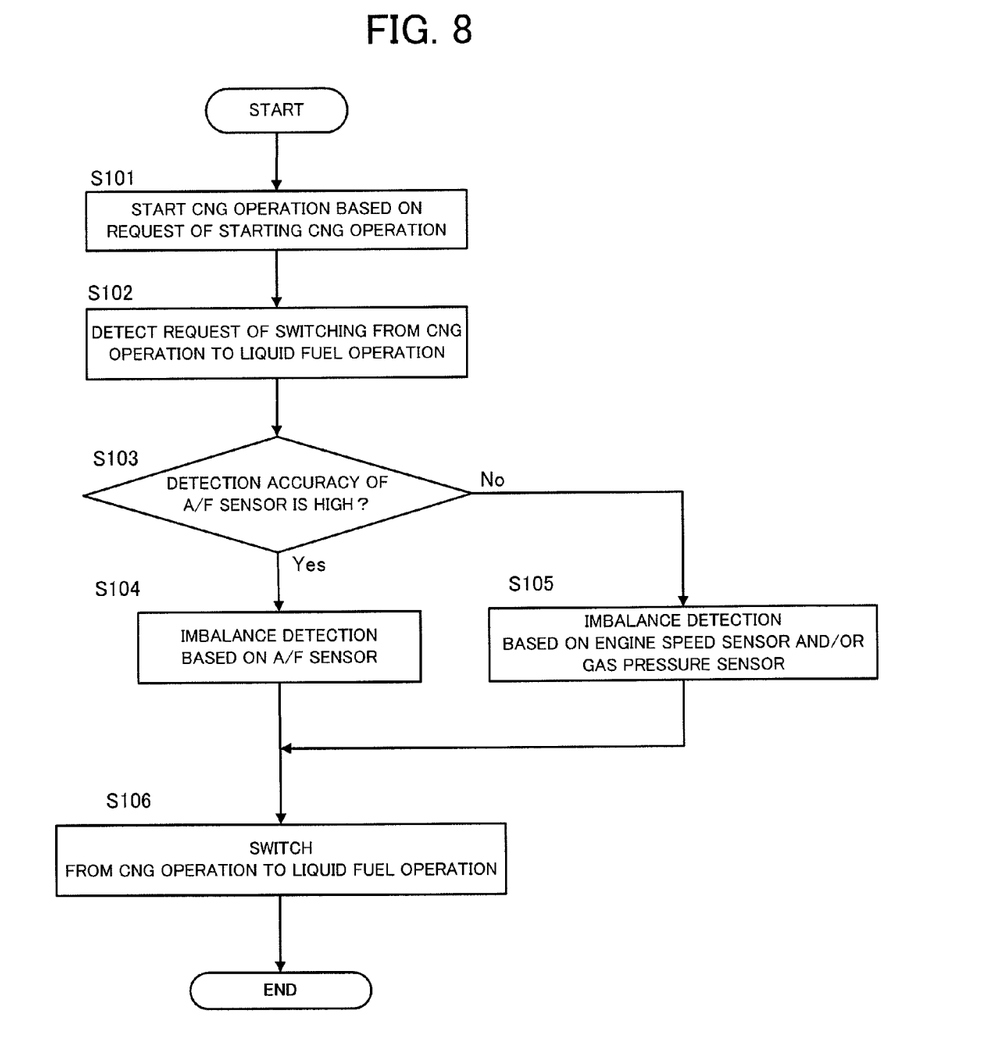
FIG. 8 is an example of a flow chart showing a procedure of the process according to the first embodiment.

FIG. 8 is an example of a flow chart showing a procedure of the process according to the first embodiment. The flow chart shown in FIG. 8 is repeatedly executed by the ECU 50 in a predetermined cycle.

First, the ECU 50 starts the CNG operation based on the request of starting the CNG operation (step S101). Preferably, the ECU 50 determines that the CNG operation should be started at the time of the starting of the mounting vehicle.

Next, the ECU 50 detects the request of switching the operation from the CNG operation to the liquid fuel operation (step S102). For example, the ECU 50 detects the request of switching from CNG operation to the liquid fuel operation when the catalyst temperature is equal or higher than a predetermined temperature and there is no possibility of the degradation of the emission even if the liquid operation is executed.

Then, the ECU 50 determines whether or not the detection accuracy of the A/F sensor 15 is high (step S103). Concretely, the ECU 50 determines whether or not the A/F sensor 15 is activated and whether or not the amount of the intake air flow is equal or larger than the predetermined amount.

Then, when determining that the detection accuracy of the A/F sensor 15 is high (step S103; Yes), the ECU 50 executes the imbalance detection based on the A/F sensor 15 (step S104). On the other hand, when determining that the detection accuracy of the A/F sensor 15 is not high (step 5103; No), the ECU 50 executes the imbalance detection based on the engine speed sensor 27 and/or the gas pressure sensor 19 (step S105). In other words, the ECU 50 executes the detection of the rotational fluctuation and/or the detection of the gas pressure fluctuation.

Next, the ECU 50 switches from the CNG operation to the liquid fuel operation (step S106).

As described above, the ECU 50 executes the detection of the rotational fluctuation and/or the detection of the gas pressure fluctuation and can execute the imbalance detection without expanding the CNG operating range in the case where the detection accuracy of the A/F sensor 15 is low and where the A/F sensor 15 is not activated and cannot be used.

In case of the above-mentioned comparative example, when the detection accuracy is not high at step S103 (step S103; No), the ECU 50 continuously waits until the detection accuracy of the A/F sensor 15 becomes high at step S103 for example. As a result, the period of executing the CNG operation is expanded.

[Second Embodiment]

In the second embodiment, besides the first embodiment, the ECU 50 executes the imbalance detection by the multiple methods at the time of the CNG operation, and corrects a standard value (hereinafter referred to as "imbalance standard value Jith") for determining where or not the imbalance occurs, on the basis of the measured values thereof. Thereby, the ECU 50 executes the imbalance detection more precisely.

Hereinafter, the above-mentioned measured value, i.e., a value which is calculated by each of the imbalance detection methods and which is compared with the imbalance standard value Jith, is referred to as "imbalance criterion value Ji". Namely, the imbalance standard value Jith includes the above-mentioned threshold Wth and the threshold ΔNeth and the imbalance criterion value Ji includes the fluctuation width W and the rotational speed variation ΔNe.

Concretely, the ECU 50 sets a main imbalance detection method (hereinafter referred to as "main determination method") for determining whether or not the imbalance occurs and determines whether or not the imbalance occurs based on the imbalance criterion value Ji which is calculated by the main determination method. Then, the ECU 50 corrects the imbalance standard value Jith of the main determination method by the imbalance criterion value Ji calculated by an imbalance detection method (hereinafter referred to as "substitute determination method") other than the main determination method.

For example, the ECU 50 stores the a map indicating the correction amounts of the imbalance standard value Jith corresponding to the imbalance criterion values Ji of the main determination method and the imbalance criterion values Ji of the substitute determination method in advance, and corrects the imbalance standard value Jith of the main determination method with reference to the map. In another example, the ECU 50 corrects the imbalance standard value Jith of the main determination method when the determination result based on the imbalance criterion value Ji of the main determination method differs from the determination result based on the imbalance criterion value Ji of the substitute determination method. In other words, the ECU 50 corrects the imbalance standard value Jith of the main determination method so that the criterion of determining that the imbalance occurs becomes stricter when the ECU 50 determines that the imbalance occurs by the main determination method and determines that imbalance does not occur by the substitute determination method. On the other hand, the ECU 50 corrects the imbalance standard value Jith of the main determination method so that the criterion of determining that the imbalance occurs becomes laxer when the ECU 50 determines that the imbalance does not occur by the main determination method and determines that the imbalance occurs by the substitute determination method.

Besides, the ECU 50 executes the imbalance detection at the time of the CNG operation after the activation of the A/F sensor 15 when the ECU 50 designates the A/F sensor 15 as the main determination method or the substitute determination method. For example, the ECU 50 restarts the CNG operation after the activation of the A/F sensor 15 in a case where the ECU 50 sets the detection of the rotational fluctuation and/or the detection of the gas pressure fluctuation as the main determination method and sets the imbalance detection based on the A/F sensor 15 as the substitute determination method. Then, the ECU 50 executes the main determination method and the substitute determination method after the activation of the A/F sensor 15 and corrects the imbalance standard value Jith of the main determination method based on the imbalance criterion value Ji of the A/F sensor 15. Even in this case, by limiting the opportunity to correct the imbalance standard value Jith as described below and limiting the opportunity of the imbalance detection based on the A/F sensor 15, the ECU 50 can limits the expansion of the CNG operating area to the minimum.

Next, a description will be given of the timing of executing the main determination method and the substitute determination method and then correcting the imbalance standard value Jith.

The ECU 50 corrects the imbalance standard value Jith at the operating range where the detection accuracy of the substitute determination method is higher than the detection accuracy of the main determination method. For example, in a case where the detection of the rotational fluctuation is set as the main determination method and the detection of the gas pressure fluctuation and the detection based on the A/F sensor 15 are set as the substitute determination method, the ECU 50 corrects the imbalance standard value Jith of the detection of the rotational fluctuation based on the detection of the gas pressure fluctuation in the idling state or other similar operating state, i.e., the operation range where the engine speed Ne is smaller than a predetermined value and where the load is low. Also, the ECU 50 corrects the imbalance standard value Jith of the detection of the rotational fluctuation on the basis of the imbalance detection based on the A/F sensor 15 at a range where the amount of the intake air flow is large in the above-mentioned case. Thereby, the ECU 50 can properly set the timing of correcting the imbalance standard value Jith of the main determination method and can correct the imbalance standard value Jith to become a more accurate value.

Preferably, the ECU 50 executes the main determination method and the substitute determination method at the same time when determining that the imbalance criterion value Ji calculated based on the main determination method is at a predetermined range (hereinafter referred to as "criterion doubtful range Iw"). Then, the ECU 50 corrects the imbalance standard value Jith of the main determination method on the basis of the substitute determination method. The above-mentioned criterion doubtful range Iw becomes wide as the imbalance ratio to be detected is large. This description will be given with reference to FIG. 9.

Figure 9:
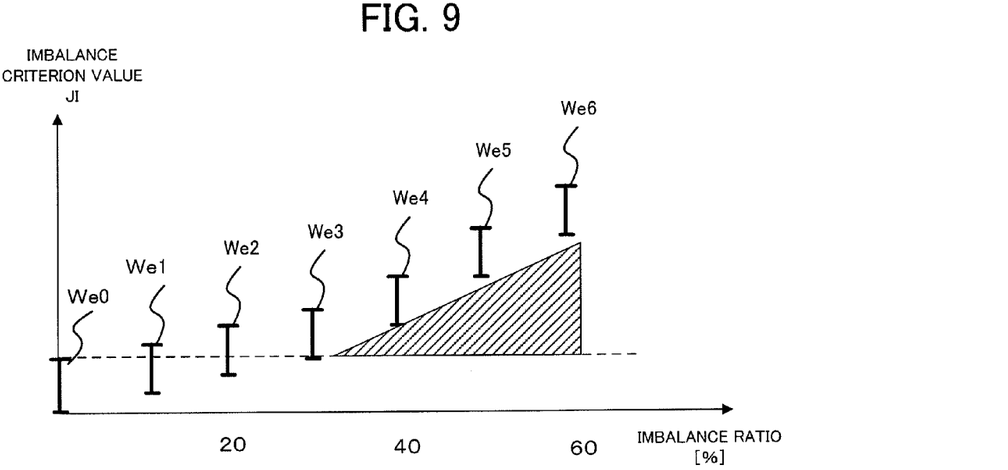
FIG. 9 shows an example of the range of the imbalance criterion value corresponding to each imbalance ratio.

FIG. 9 shows an example of the range of the imbalance criterion value Ji corresponding to each imbalance ratio. Here the term "the range of the imbalance criterion value Ji" indicates a range of the vicinity of the average of the imbalance criterion value Ji corresponding to each imbalance ratio. Concretely, the line segment "We0" indicates the range of the imbalance criterion value Ji in the case where the imbalance ratio is 0, i.e., the normal case where the imbalance does not occur, and the line segment "We1" indicates the range of the imbalance criterion value Ji in the case where the imbalance ratio is 10%. Similarly, the line segments "We2" to "We6" indicate the ranges of the imbalance criterion values Ji in the cases where the imbalance ratios are between 20% and 60%, respectively.

As shown in FIG. 9, the larger the imbalance ratio becomes, the more the range of the imbalance criterion value Ji is apart from the range of the imbalance criterion value Ji in the normal case corresponding to the line segment We0. Therefore, in a case where the imbalance ratio is equal or larger than 40%, there is formed the gray area corresponding to the triangle shown in FIG. 9 which does not belongs neither the range indicated by the line segment We0 nor the range indicatedby the line segment corresponding to the imbalance ratio.

In consideration of the above mentioned facts, the ECU 50 sets the criterion doubtful range Iw corresponding to the gray area in advance, and executes the imbalance detection based on the main determination method and the substitute determination method in the case where the imbalance criterion value Ji based on the main determination method belongs to the criterion doubtful range Iw. The above-mentioned criterion doubtful range Iw is set in the vicinity of the imbalance standard value Jith by experimental trials for example. Then, after determining whether or not the imbalance occurs based on the main determination method and the substitute determination method, the ECU 50 corrects the imbalance standard value Jith of the main determination method. Thereby, the ECU 50 can properly set the timing when the imbalance standard value Jith should be corrected.

Figure 10:
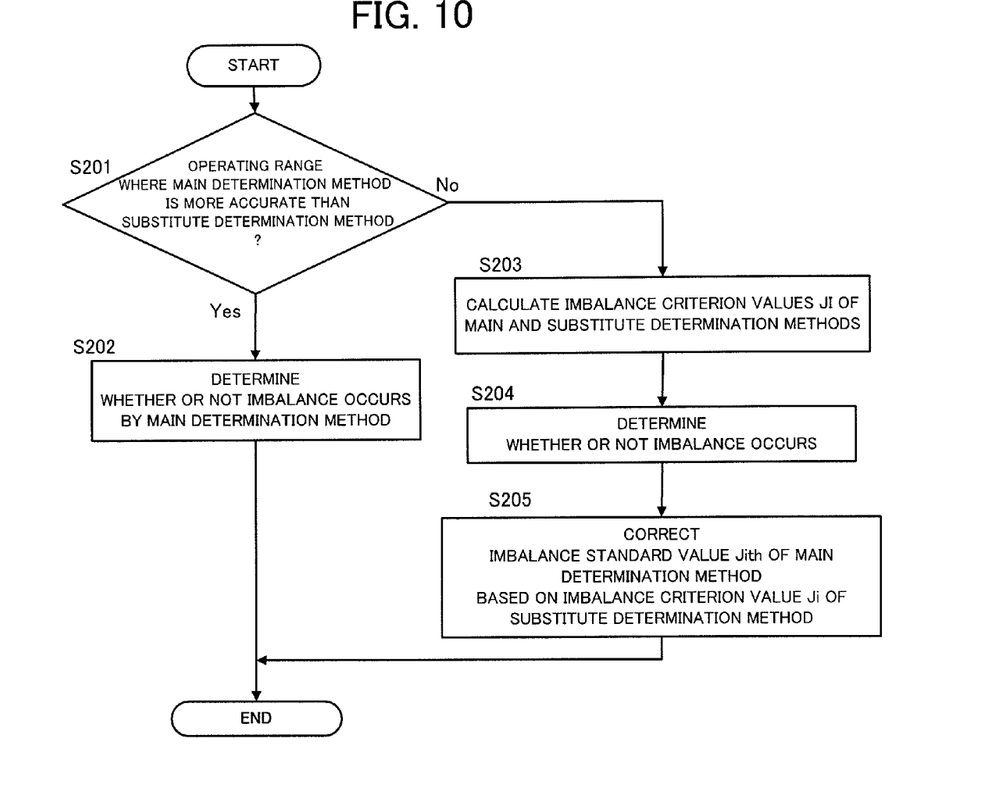
FIG. 10 is an example of a flow chart showing a procedure of the process according to the second embodiment.

FIG. 10 is a flow chart indicating a procedure of the process according to the second embodiment. The flow chart shown in FIG. 10 is repeatedly executed by the ECU 50 in a predetermined cycle.

First, the ECU 50 determines whether or not the internal combustion engine 100 is at an operating range where the detection accuracy of the main determination method is higher than that of the substitute determination method (step S201). Then, when the internal combustion engine 100 is at the operating range where the detection accuracy of the main determination method is higher than that of the substitute determination method (step S201; Yes), the ECU 50 determines whether or not the imbalance occurs by the main determination method (step S202). Namely, in this case, the ECU 50 determines that the determination result based on the main determination method is more reliable than the determination result based on the substitute determination method, and then executes the determination of the imbalance only by the main determination method and does not correct the imbalance standard value Jith of the main determination method. Thereby, the ECU 50 prevents the deterioration of the accuracy of the imbalance standard value Jith of the main determination method due to the correction.

On the other hand, when the internal combustion engine 100 is at the operating range where the detection accuracy of the main determination method is not higher than that of the substitute determination method (step S201; No), the ECU 50 calculates the imbalance standard values Jith of the main determination method and the substitute determination method (step S203). Then the ECU 50 determines whether or not the imbalance occurs (step S204). In this case, the ECU 50 may determine whether or not the imbalance occurs based on both of the main determination method and the substitute determination method or may determine whether or not the imbalance occurs based on only the substitute determination method. In the former case, in which the determination result by the main determination method differs from the determination result by the substitute determination method, the ECU 50 takes priority of the determination result by the substitute determination method for example. In another example, the ECU 50 may determines whether or not the imbalance occurs by the majority decision of the determination results from each of the imbalance detections when the ECU 50 executes three or more kinds of imbalance detections with a total of the main determination methods and the substitute determination methods.

Then, the ECU 50 corrects the imbalance standard value Jith of the main determination method based on the imbalance criterion value Ji of the substitute determination method (step S205). For example, the ECU 50 adds or subtracts a predetermined value to or from the imbalance standard value Jith of the main determination method when the determination result based on the imbalance criterion value Ji of the main determination method differs from the determination result based on the imbalance criterion value Ji of the substitute determination method. In another example, the ECU 50 corrects the imbalance standard value Jith based on the imbalance criterion value Ji of the main determination method and the imbalance criterion value Ji of the substitute determination method with reference to a predetermined map. The above-mentioned map is prepared in advance by experimental trials and is stored in the memory of the ECU 50. Thereby, the ECU 50 can improve the accuracy of the imbalance standard value Jith of the main determination method.

[Modification]

Next, a description will be given of modifications of each embodiment described above. The following modifications may be applied to each of the above-mentioned embodiments in combination.

(First Modification)

In the explanation with respect to FIG. 1, the CNG is stored in the first fuel tank 25 and the CNG is supplied to each cylinder by the first fuel injection valve 1x. But, the fuel to which the present invention can be applied is not limited to this fuel. Instead, other kinds of gas fuels such as LPG (Liquefied Petroleum Gas) and LNG (Liquefied Natural Gas) can be stored in the first fuel tank 25. Even in this case, the ECU 50 executes the imbalance detection based on the first embodiment at the time of the operation by the gas fuel, and corrects the imbalance standard value Jith based on the second embodiment at the time of the operation by the gas fuel.

(Second Modification)

In FIG. 1, the internal combustion engine 100 includes the A/F sensor 15 and the ECU 50 executes the imbalance detection based on the A/F sensor 15. Instead of this or besides this, the internal combustion engine 100 includes the O2 sensor which is provided on the exhaust passage 16 at the downstream side of the catalyst 28, and the ECU 50 executes the imbalance detection based on the detection values supplied from the O2 sensor. Even in this case, for example, the ECU 50 determines that the imbalance occurs when the variation of the detection values supplied from the O2 sensor is equal or larger than a predetermined width similarity to the explanation with respect to FIG. 5. Thereby, the ECU 50 can execute the imbalance detection based on the O2 sensor similarly to the imbalance detection based on the A/F sensor 15.

(Third Modification)

In the explanation with respect to FIG. 8, the ECU 50 executes the imbalance detection of the CNG operation at the timing of switching from the CNG operation to the liquid fuel operation. But, the timing of the imbalance detection at the time of the CNG operation to which the present invention can be applied is not limited to the timing. For example, instead of this, the ECU 50 may execute the imbalance detection in a predetermined cycle at the time of the CNG operation. Even in this case, the ECU 50 can execute the imbalance detection at the time of the CNG operation based on the detection of the rotational fluctuation and/or the detection of the gas pressure fluctuation.

BRIEF DESCRIPTION OF THE REFERENCE NUMBER

1x First fuel injection valve
1y Second fuel injection valve
2 Intake valve
3 Sparking plug
4 Exhaust valve
7 Cylinder
9 Piston
10 Connecting rod
11 Intake passage
12 Electronic throttle valve
13 Surge tank
15 A/F sensor
21 Regulator
50 ECU
100 Internal combustion engine

The invention claimed is:

1. A malfunction detecting device for an internal combustion engine, comprising:
an engine which includes plural cylinders and which is capable of switching plural kinds of fuels including a gas fuel and a liquid fuel;
a gas pressure sensor provided on a passage or in a pipe for supplying the gas fuel to each of the cylinders;
an air-fuel ratio sensor provided on an exhaust passage connected to the engine;
an injection quantity estimation unit configured to estimate, when there is a request to switch from an operation by the gas fuel to an operation by the liquid fuel and the air-fuel ratio sensor is not activated, an injection quantity of each of the cylinders at a time of the operation by the gas fuel based on a decreasing degree of gas pressure detected by the gas pressure sensor;
a malfunction detection unit configured to detect a malfunction with respect to an imbalance of air fuel ratios among the cylinders based on the injection quantity of each of the cylinders estimated by the injection quantity estimation unit; and
a switching unit configured to switch from the operation by the gas fuel to the operation by the liquid fuel after detecting the malfunction by the malfunction detection unit.

2. The malfunction detecting device for an internal combustion engine according to claim 1, further comprising:
a catalyst which is provided on an exhaust passage connecting to the engine,
wherein the engine is capable of switching between a compressed natural gas and a liquid fuel, and
wherein an operation based on the compressed natural gas is executed only when a temperature of the catalyst is equal to or smaller than a predetermined temperature which is smaller than an activation temperature.

3. The malfunction detecting device for an internal combustion engine according to claim 1,
wherein the malfunction detection unit executes a correction of a criterion for determining whether or not the malfunction occurs used by a detection method for detecting the malfunction, based on measured values by another detection method at the time of the operation based on the gas fuel.

4. The malfunction detecting device for an internal combustion engine according to claim 3,
wherein the malfunction detection unit executes the correction at a time of an operating range where a detection accuracy of the other detection method is higher than a detection accuracy of the detection method for detecting the malfunction.

5. The malfunction detecting device for an internal combustion engine according to claim 1,
wherein the malfunction detection unit detects the malfunction based on each lower limit of gas pressure in a period of the fuel injection to each of the cylinders.

6. The malfunction detecting device for an internal combustion engine according to claim 1,
wherein the switching unit executes the switching operation based on the injection quantity estimate instead of a sensing of the air fuel ratio sensor.

7. A malfunction detecting device for an internal combustion engine, comprising:
an engine which includes plural cylinders and which is capable of switching plural kinds of fuels including a gas fuel and a liquid fuel;
a gas pressure sensor provided on a passage or in a pipe for supplying the gas fuel to each of the cylinders;
an air-fuel ratio sensor provided on an exhaust passage connected to the engine; and
an electronic control unit configured with executable program logic to perform:
estimating, when there is a request to switch from an operation by the gas fuel to an operation by the liquid fuel and the air-fuel ratio sensor is not activated, an injection quantity of each of the cylinders at a time of the operation by the gas fuel based on a decreasing degree of gas pressure detected by the gas pressure sensor;
detecting a malfunction with respect to an imbalance of air fuel ratios among the cylinders based on the injection quantity of each of the cylinders estimated by the injection quantity estimation unit; and
switching from the operation by the gas fuel to the operation by the liquid fuel after detecting the malfunction by the malfunction detection unit.

* * * * *